(12) United States Patent
Heusinkveld (10) Patent No.: US 11,717,747 B2
(45) Date of Patent: Aug. 8, 2023

(54) SHIFTER SIMULATOR SYSTEM, SIMULATOR PROVIDED THEREWITH AND METHOD FOR OPERATING

(71) Applicant: Heusinkveld Engineering B.V., Groningen (NL)

(72) Inventor: Niels Heusinkveld, Paterswolde (NL)

(73) Assignee: Heusinkveld Engineering B.V., Groningen (NL)

( * ) Notice: Subject to any disclaimer, the term of this patent is extended or adjusted under 35 U.S.C. 154(b) by 0 days.

(21) Appl. No.: 18/091,932

(22) Filed: Dec. 30, 2022

(65) Prior Publication Data

US 2023/0211231 A1 Jul. 6, 2023

(30) Foreign Application Priority Data

Jan. 3, 2022 (NL) ...................................... 2030395

(51) Int. Cl.
*A63F 13/24* (2014.01)
*A63F 13/245* (2014.01)
(Continued)

(52) U.S. Cl.
CPC ............ *A63F 13/24* (2014.09); *A63F 13/245* (2014.09); *A63F 13/803* (2014.09); *F16H 59/044* (2013.01); *F16H 59/105* (2013.01); *F16H 61/24* (2013.01); *G05G 9/047* (2013.01); *A63F 2300/1043* (2013.01);
(Continued)

(58) Field of Classification Search
CPC ...... A63F 13/24; A63F 13/245; A63F 13/803; A63F 2300/1043; A63F 2300/1062; A63F 2300/1087; F16H 59/044; F16H 59/105; F16H 61/24; F16H 2061/241; F16H 2061/242; G05G 9/047; G05G 2009/04766

See application file for complete search history.

(56) References Cited

U.S. PATENT DOCUMENTS 4,926,172 A * 5/1990 Gorsek ................... H01H 25/04
341/20
5,197,003 A * 3/1993 Moncrief ................ F16H 61/24
434/45

(Continued)

FOREIGN PATENT DOCUMENTS

EP 0257139 3/1988
EP 3416022 12/2018

*Primary Examiner* — William H McCulloch, Jr.
(74) *Attorney, Agent, or Firm* — Marcus C. Dawes (57) ABSTRACT

A shifter simulator system comprising a frame with a gear stick hinge, a gear stick that is hingedly connected to the frame via the gear stick hinge, and a moveable frame part configured for moving relative to the frame and provided with a first contact surface and a second contact surface. The shifter simulator system also includes a magnetic contact and a tilting element configured for tilting around a tilting axis via a tilting connection in response to a movement of the gear stick and providing a first lever, and wherein the tilting element is provided with a first contact element and a second contact element configured for engaging the respective first and second contact surfaces of the moveable frame part providing a second lever, and by moving the moveable frame part defining a shifter movement with the magnetic contact. The first and/or second levers are adjustable.

20 Claims, 12 Drawing Sheets

(51) Int. Cl.
*A63F 13/803* (2014.01)
*G05G 9/047* (2006.01)
*F16H 61/24* (2006.01)
*F16H 59/04* (2006.01)
*F16H 59/10* (2006.01)

(52) U.S. Cl.
CPC ............. *A63F 2300/1062* (2013.01); *A63F 2300/1087* (2013.01); *F16H 2061/241* (2013.01); *F16H 2061/242* (2013.01); *G05G 2009/04766* (2013.01)

(56) References Cited

U.S. PATENT DOCUMENTS

| | | | | |
|---|---|---|---|---|
| 5,680,796 A * | 10/1997 | Wustenberg | ............ | G05G 5/06 74/471 XY |
| 5,749,268 A * | 5/1998 | Nishimura | ............ | F16H 61/24 74/471 XY |
| 5,868,620 A * | 2/1999 | Wada | .................... | A63F 13/422 463/38 |
| 6,029,537 A * | 2/2000 | Nagao | .................... | G05G 9/047 74/471 XY |
| 6,030,291 A * | 2/2000 | Maki | ....................... | G06F 3/016 345/161 |
| 6,104,382 A * | 8/2000 | Martin | .................... | A63F 13/24 345/161 |
| 6,448,670 B1 * | 9/2002 | Onodera | ................ | G05G 9/047 74/473.1 |
| 7,104,152 B2 * | 9/2006 | Levin | ...................... | F16H 61/24 74/471 XY |
| 7,563,169 B2 * | 7/2009 | Miyakawa | ............... | G05G 9/04 345/161 |
| 7,650,810 B2 * | 1/2010 | Levin | ...................... | F16H 61/24 74/471 XY |
| 8,371,187 B2 * | 2/2013 | Payandeh | ................ | B25J 13/02 74/471 XY |
| 10,372,153 B2 * | 8/2019 | Nakano | .................. | F16H 59/02 |
| 10,822,013 B2 * | 11/2020 | Bonfante, Jr. | ......... | B60K 23/02 |
| 2003/0188594 A1 * | 10/2003 | Levin | ...................... | F16H 61/24 74/473.12 |
| 2007/0082735 A1 * | 4/2007 | Bell | ........................ | A63F 13/24 463/38 |
| 2009/0038426 A1 * | 2/2009 | Buttolo | ................... | F16H 61/24 74/473.3 |
| 2009/0115407 A1 * | 5/2009 | Takigawa | ............... | F16H 59/105 324/207.21 |
| 2014/0210717 A1 * | 7/2014 | Hoover, Jr | ............... | A63F 13/00 345/161 |
| 2017/0139437 A1 * | 5/2017 | Miyachi | .................. | G05G 25/04 |
| 2019/0358535 A1 * | 11/2019 | Chen | ....................... | A63F 13/245 |

* cited by examiner

SHIFTER SIMULATOR SYSTEM, SIMULATOR PROVIDED THEREWITH AND METHOD FOR OPERATING

The present invention relates to a shifter simulator system for simulator environment. Such shifter simulator system can be used in combination with racing simulation software that is used for gaming, testing etc.

Racing simulation software is used by gamers as well as engineers and racing professionals. To provide a more realistic driving experience so-called simulator peripherals have been developed. These peripherals include steering wheels, pedals and shifters. Optionally, these peripherals are mounted to a frame or so-called simulation rig. Conventional shifter simulator systems that are known from practice rely on resilient pressure parts to provide a shifter resistance and to improve the driver experience.

One of the problems with these conventional shifter simulator systems is that the mechanisms are relatively inflexible. This limits the driver experience in the simulator that is provided with such shifter simulator system. Furthermore, when in use, significant forces are applied to the shifter simulator system. Therefore, a robust and flexible shifter simulator system for a simulator environment is required.

The present invention has for its object to obviate or at least reduce one or more of the above-stated problems with conventional shifter simulator systems and to provide a shifter simulator system that is more flexible and capable of dealing with the applied forces.

The present invention provides for this purpose shifter simulator system for a simulator environment, wherein the shifter simulator system according to the invention comprises:
- a frame with a gear stick hinge;
- a gear stick that is hingedly connected to the frame via the gear stick hinge;
- a moveable frame part configured for moving relative to the frame and provided with a first contact surface and a second contact surface;
- a magnetic contact; and
- a tilting element configured for tilting around a tilting axis via a tilting connection in response to a movement of the gear stick and providing a first lever, and wherein the tilting element is provided with a first contact element and a second contact element configured for engaging the respective first and second contact surfaces of the moveable frame part providing a second lever, and by moving the moveable frame part defining a shifter movement with the magnetic contact.

The shifter simulator system according to the invention is provided with a frame having a gearstick hinge that enables a gearstick to rotate over an angle relative to the frame. A user engages the gearstick to shift gears in the simulator environment. When engaging the gearstick, this gearstick moves relative to the frame thereby moving a tilting element. The tilting element moves over a tilting angle in response to the movement of the gearstick over a gearstick angle. In a presently preferred embodiment the tilting connection between the tilting element and the gearstick provides a first lever that transfers forces from the gearstick to the tilting element. The tilting element engages a movable frame part when moving. This engagement is achieved by first and second contact elements that engage the respective first and second contact surfaces of this movable frame part. When the moving gearstick moves the tilting element with the aid of the first lever, also the first and second contact elements move. Depending on the direction of movement of the gearstick the first or second contact element engages the respective first or second contact surface of the movable frame part, thereby defining a second lever. The movable frame part is then moved with the aid of this second lever.

In one of the presently preferred embodiments, independent of the direction of movement of the gear stick, the movable frame part moves in an upward direction such that the magnetic contact is influenced thereby defining a shifter movement.

The shifter simulator system according to the present invention provides a compact system that is optionally manufactured from a lightweight material to provide a lightweight shifter simulator system. In addition, by providing a first and second lever the mechanism is relatively simple and also very robust. This prevents damage to the system caused by an "overenthusiastic" user of the shifter simulator system.

Providing a magnetic contact enables a correct definition of an actual shifter movement that is intended in the simulator. Furthermore, the magnetic contact remains stable in time such that the performance of the shifter simulator system according to the present invention substantially remains the same during its lifetime, while conventional shifter simulator systems are confronted with less functioning parts (fatigue) and even failure. Therefore, the shifter simulator system according to the present invention provides a more stable system that, in addition, remains stable during a long lifetime.

In a presently preferred embodiment of the invention the shift simulator system further comprises a spring element configured for providing a counterforce.

Providing a spring element, such as a spring, provides a counterforce against a change in the magnetic contact. This improves the driver experience. Furthermore, the use of a spring element provides the possibility to define a rest position, wherein the magnetic contact is kept unless a user activates the gearstick. In one of the presently preferred embodiments the magnetic contact comprises a magnet and a metal plate element that engage each other in a position of rest. When moving the gearstick in a forward or backward direction the plate and magnet are disengaged thereby defining a shifter movement in the simulator system. This engagement works against any magnetic forces and against the optional spring force. The spring force provided by the spring element forces the magnets and plate elements to engage each other when releasing the gearstick. The magnetic element can be a permanent magnet and/or an electromagnet. One or both of the plate element and magnet element can be moved. In a presently preferred embodiment the magnetic element is a permanent magnet. This provides a robust and stable element and guarantees a robust operation. Also in a presently preferred embodiment the magnetic element is provided as a stationary element in the frame.

In a presently preferred embodiment the tilting connection is an adjustable connection.

Providing the tilting connection as an adjustable connection enables an adjustable first lever. Such tilting connection can be a pawl/pen groove connection or any suitable alternative connection. One of the advantages of applying a groove is the enablement of a continuously adjustable connection over a first adjustment range. In one of the presently preferred embodiments the first adjustment range is about 7 mm. Alternatively, the first adjustment range can be selected from a range of 2 to 25 mm, preferably 5 to 10 mm, and more preferably 6 to 8 mm. The application of the first adjustment range further improves the flexibility of the shifter simulator system according to the present invention and provides further improved user experiences of any simulator system using such shifter simulator system. In fact, the possibility to have an adjustable connection provides the possibility to tune the shifter simulator system to user preferences and/or to enable tuning the behavior of the shifter simulator system in correspondence with the simulator settings, such as the chosen vehicle in a simulator game. This further improves user experiences with a simulator that is provided with a shifter simulator system of the present invention.

In a further preferred embodiment of the present invention the shifter simulator system further comprises an adjustable first and/or second contact element.

Providing an adjustable first and/or second contact element enables providing an adjustable second lever. As was already described in relation to an adjustable first lever this improves user experiences and increases tuning possibilities for the user and the simulator. In a presently preferred embodiment the first and second contact elements are provided as pins, pens, or pawls that are movable in a groove or groove-like element. It will be understood that other suitable connections can also be envisaged.

In one of the presently preferred embodiments the groove length defines a second adjustment range of about 9.5 mm for each individual contact element. Alternatively, the second adjustment range is selected from the range of 5 to 25 mm, more preferably 7.5 to 15 mm, and is most preferably in the range of 9 to 12 mm. Preferably, the adjustable first and/or second contact elements are positionable on the tilting element. This provides an easy adjustable mechanism thereby enabling a user to adjust the settings of the shifter simulator system.

As indicated for the first adjustment range, preferably also the adjustable first and/or second contact elements, are continuously adjustable in the second adjustment range. This further improves the flexibility when using the shifter simulator system of the present invention.

In a presently preferred embodiment the shifter simulator system comprises both a first adjustable lever and the second adjustable lever. Providing one or preferably both levers as an adjustable lever enables selection of the counter force when using the gearstick. In an optional embodiment of the invention a shifter force lies in the range of 3.5 to 9 kg. It will be understood that other shifter forces can also be envisaged by using appropriate dimensions of the shifter simulator system according to the present invention.

In a further presently preferred embodiment the first and second contact elements are separately positionable. This provides an opportunity to have different settings for shifting up versus shifting down. This further contributes to the overall user experiences when using the shifter system according to the present invention.

In a further preferred embodiment of the invention the shifter simulator system further comprises a stop.

By providing a stop or safety stop the movement of the gear stick is restricted. This is in line with actual driver experiences wherein shifting gears is also done with limited movement of a gearstick. Furthermore, this provides an additional safety measure for the shifter simulator system of the present invention. In one of the optional embodiments of the invention the gear angle is plus or minus 7.5°. Alternatively, the gear angle is in the range of 5° to 25°, more preferably 6° to 12°, most preferably in the range of 7° to 9°.

In a further preferred embodiment of the invention the shifter simulator system further comprises an optical sensor for detecting shifter position and/or shifter movement.

The use of an optical sensor provides a reliable and robust detection of any shifter position change/movement. More specifically, tests have shown that the optical sensor is more reliable and robust than the conventional microswitches or potentiometers. In a presently preferred embodiment the optical sensor comprises a so-called Opto-interrupter. It will be understood that other detectors can also be envisaged in accordance with the present invention.

The present invention further relates to a simulator comprising a shifter simulator system in an embodiment of the present invention.

Such simulator provides the same or similar effects and/or advantages as described with respect to the shifter simulator system.

Tests have shown that the user experiences are significantly improved in a simulator that comprises the shifter similar the system of the present invention.

The present invention further also relates to a method for operating a shifter simulator system for a simulator environment, the method comprising the steps of:
providing a shifter simulator system and/or simulator according to an embodiment of the present invention; and
moving the gearstick such that the magnetic contact is influenced.

The method provides the same or similar effects and/or advantages as described with respect to the shifter simulator system and/or simulator. Preferably, the shifter simulator system provides a signal to the simulator when the magnetic contact is influenced thereby defining an intended gearchange by the user. This provides a reliable and robust operation with optimal user experiences.

Further advantages, features and details of the invention are elucidated on the basis of preferred embodiments thereof, wherein reference is made to the accompanying drawings, in which.

Shifter simulator system 2 (FIGS. 1A-C, 2A-C) comprises gearstick 4 with grip 6. Frame 8 is provided in housing 10 and comprises gearstick hinge 12 that connects frame 8 to gearstick 4. Frame 8 houses movable frame part 14 that comprises contact surfaces 16 with first and second contact surfaces 16 a-b. Magnetic contact 18 (FIG. 2B-C) comprises metal plate element 20 and permanent magnet 22. Plate element 20 is connected via contact element 23 to movable frame part 14.

Frame 8 further houses tilting element 24 that is connected via hinge or hinge axis 26 to frame 8. Tilting connection 28 connects tilting frame 24 to gearstick 4. In the illustrated embodiment tilting connection 28 (FIG. 2A) comprises cam or pawl 30 and contact element 32 that are provided in chamber 34 that is provided in movable frame part 14. Tilting element 24 comprises a groove like recess 36

Figure 1A:
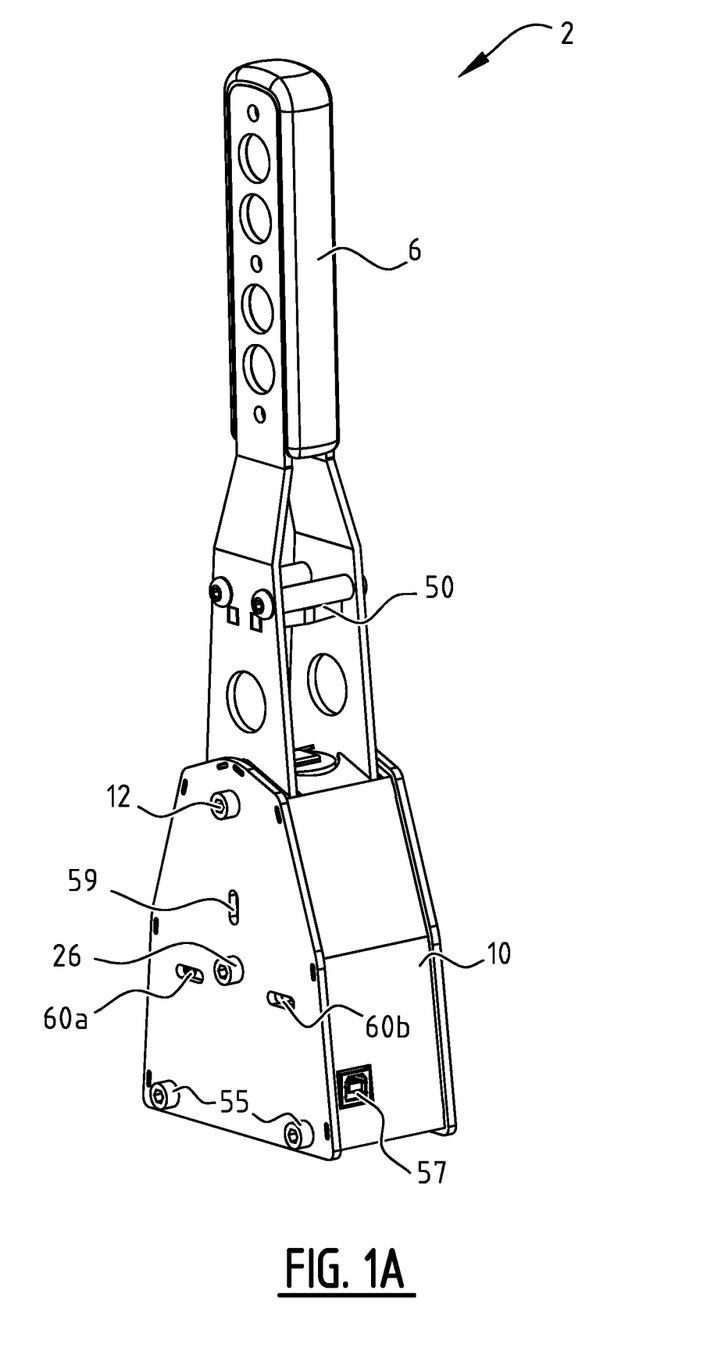
FIGS. 1A-C show a shifter simulator system according to the present invention.
Figure 1B:
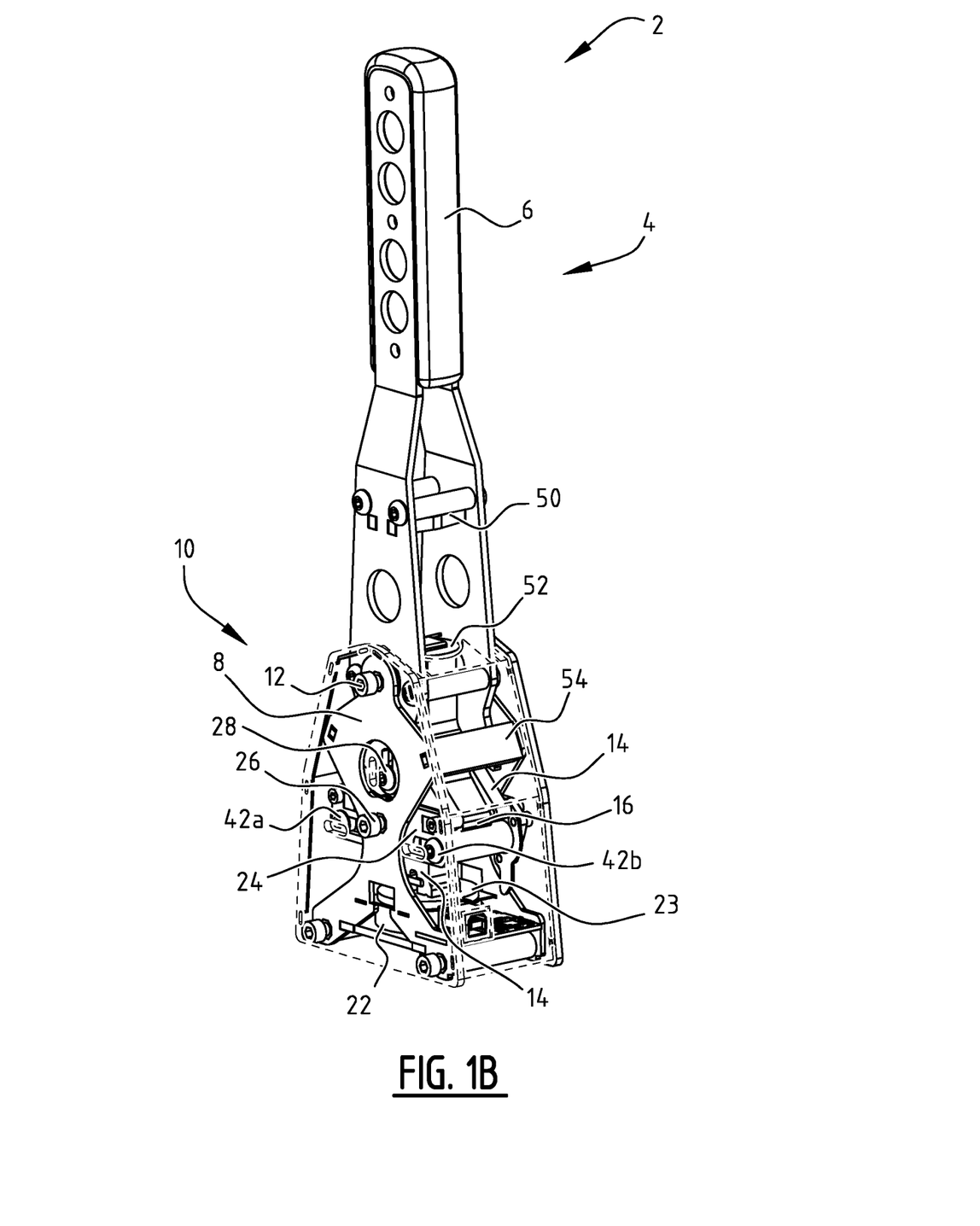
Figure 1C:
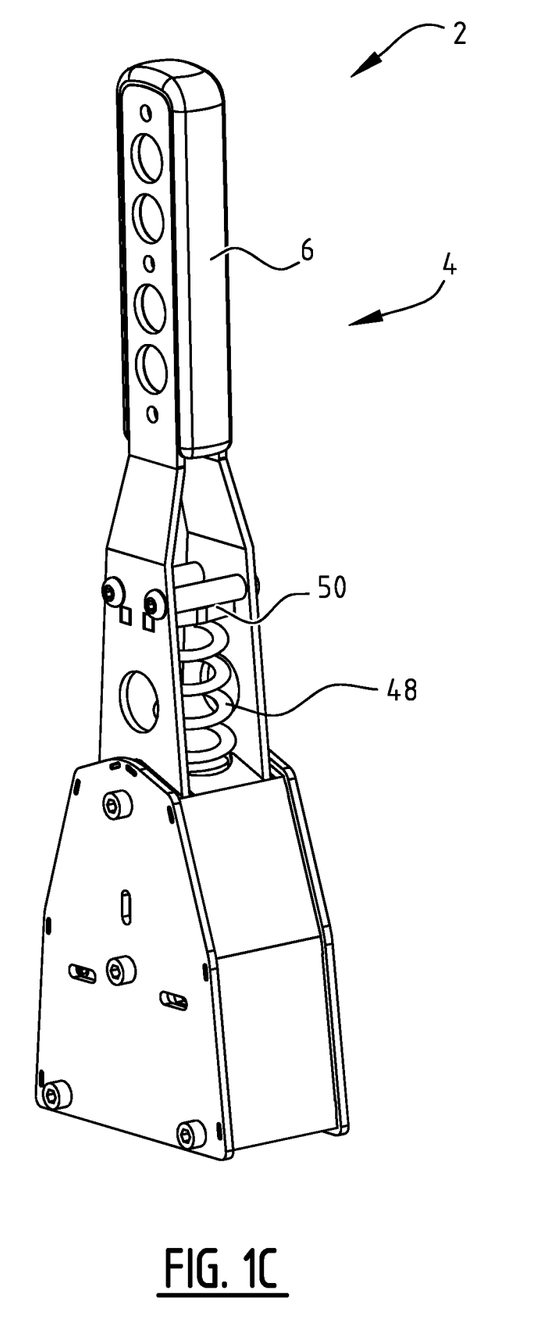
Figure 2A:
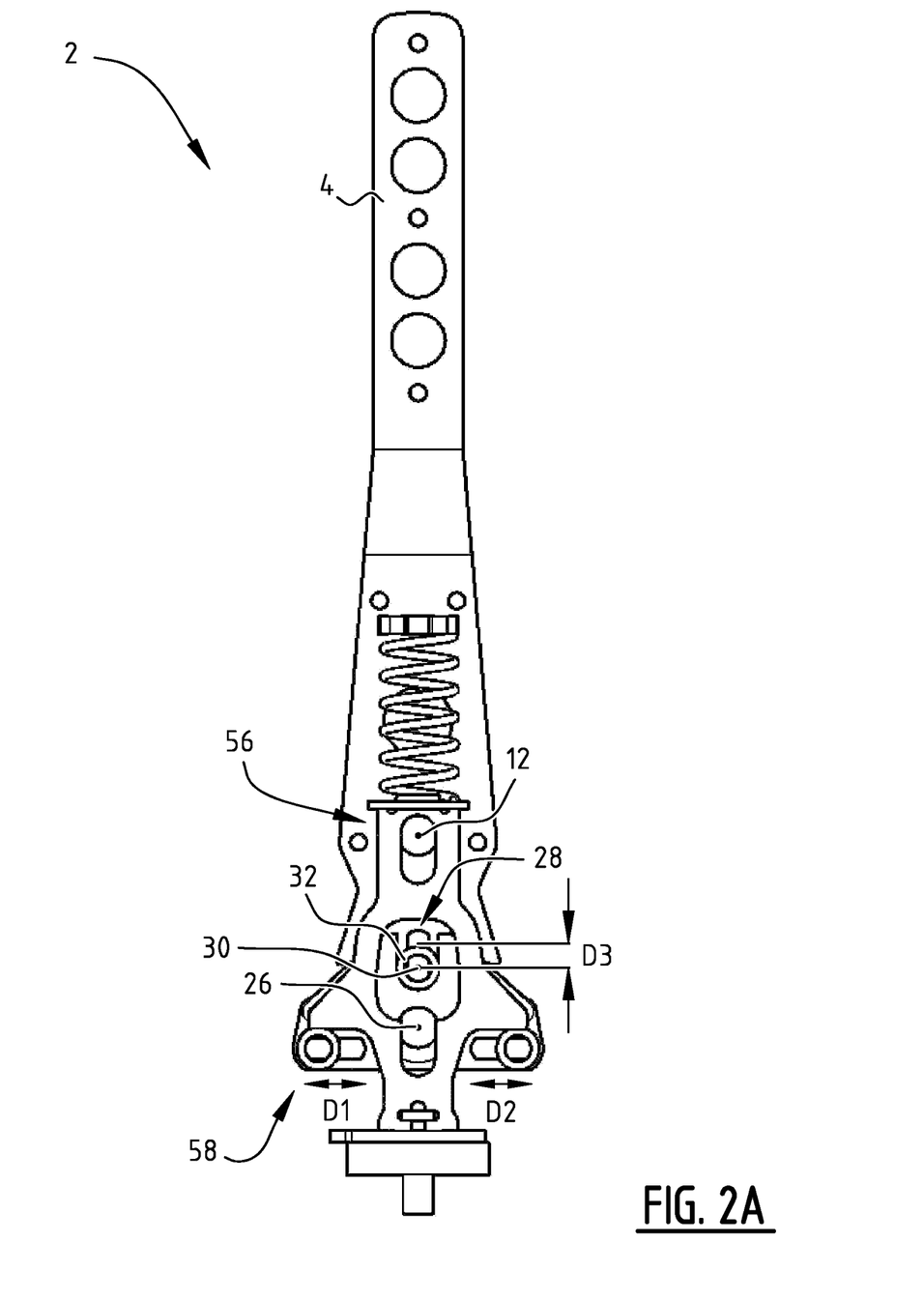
FIGS. 2A-C show the operation of the shifter simulator system of FIG. 1.
Figure 2B:
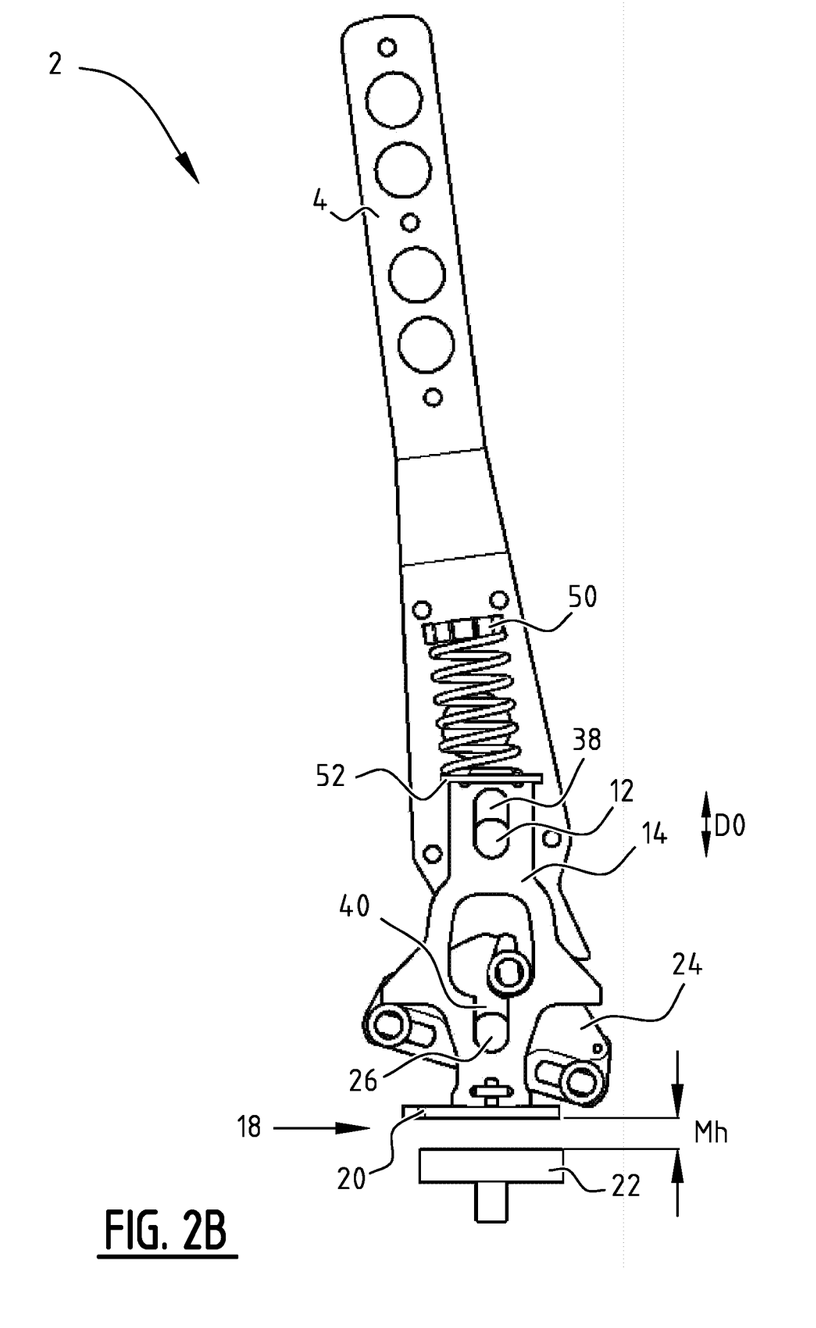
Figure 2C:
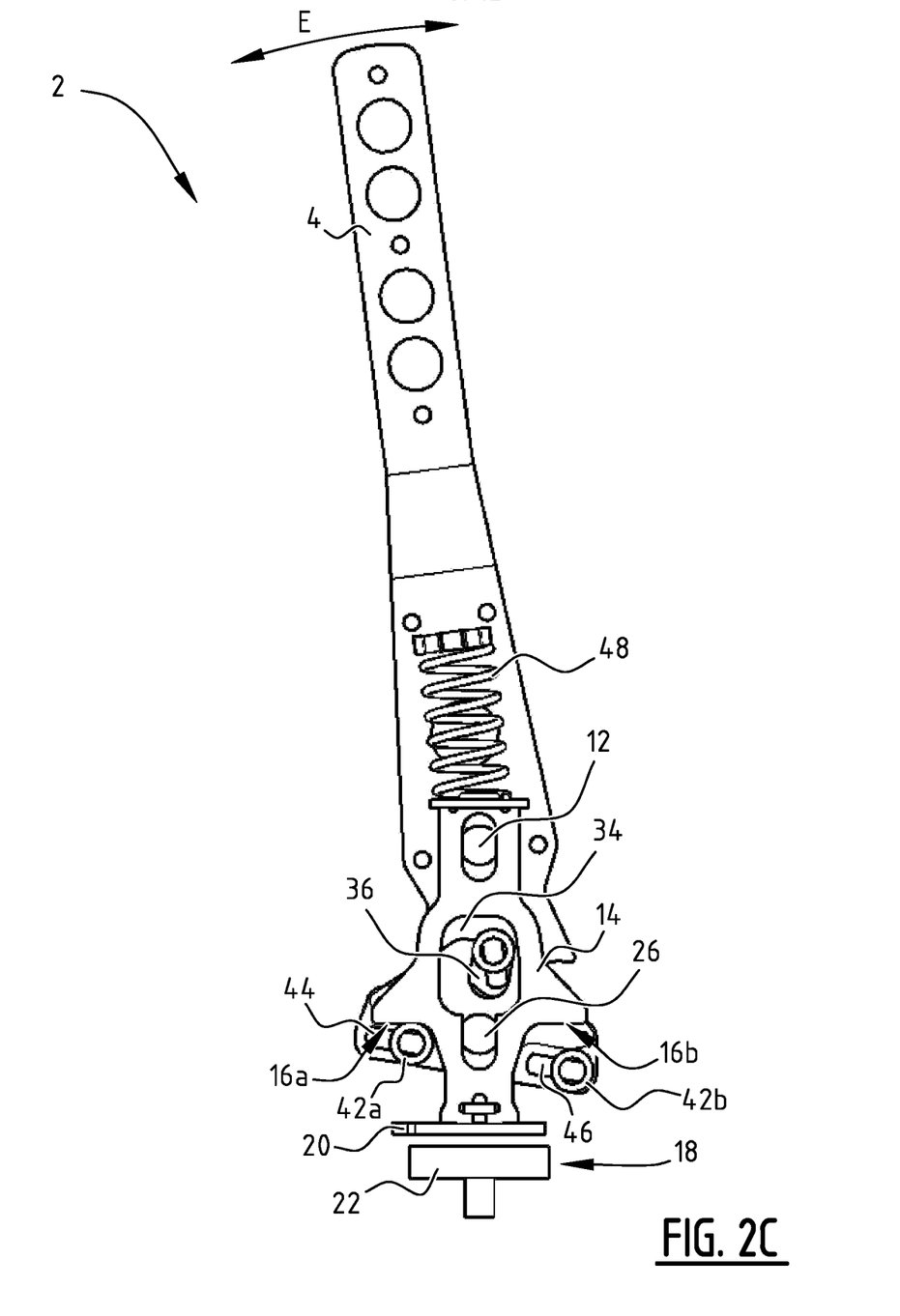

(FIG. 2C). Furthermore, movable frame part 14 comprises groove or groove like element 38 (FIG. 2B) that is configured for receiving gearstick hinge 12. In addition, movable frame part 14 is provided with groove or groove like element 40 for receiving the tilting axis or tilting shaft 26.

In the illustrated embodiment first and second contact elements 42 a-b are provided to respective grooves 44, 46. In the illustrated embodiment spring 48 is provided between upper mounting plate 50 that is attached to balls or pens 51 and lower mounting plate 52. Optionally, pens 51 can be repositioned to provide a further possibility to adjust the spring force. In addition, stop 54 is provided in frame 8 to limit the movement of gearstick 4.

Shifter simulator system 2 provides first lever 56 and second lever 58 that are both provided as adjustable levers in the illustrated embodiment.

Housing 10 and frame 8 are connected using elements 12, 26 that also act as hinge shafts or hinge axes for gearstick 4 and tilting element 24, respectively. It will be understood that several other and/or alternative connections can also be envisaged in accordance with the present invention. This may include some further screws, pens or pawls 55 to connect housing 10 to frame 8. In the illustrated embodiment connector 57 is provided to connect shifter simulator system 2 to another device, such as a simulator. In the illustrated embodiment housing 10 is provided with recesses or openings 59, 60 a-b to enable a user to adjust the position of hinge 28 and contact elements 42 a-b.

In the illustrated embodiment gearstick 4 is able to rotate in direction E (FIG. 2E) over an angle of +7.5° and −7.5°. The position of contact element 32 relative to cam, pen or pawl 30 of connection 28 can be adjusted over adjustment range D3 (FIG. 2A). In the illustrated embodiment adjustment range D3 is about 7 mm. The second adjustment ranges D1 and D2 are about 9.5 mm in the illustrated embodiment. It will be understood that other dimensions can also be envisaged in accordance with the present invention.

When moving gearstick 4 in a direction E tilting element 24 will make a counter rotation in direction F around hinge 26 (FIG. 2C). Rotation of tilting element 24 forces either of first or second contact elements 42 a-b to engage the respective contact surface 16 a-b of movable frame part 14 that is pushed in upward direction D0 against the counterforce of spring 48 (FIG. 2B). This upward movement of movable frame part 14 disengages plate 20 from permanent magnet 22 over a contact distance Mh that is in the range of 3.5 to 9 mm depending on the actual settings of the adjustable first and second contact elements 42 A-B and adjustable tilting connection 28. It will be understood that other dimensions can also be envisaged in accordance with the present invention.

In an alternative embodiment shifter simulator system 102 comprises gearstick 104 with grip 106. Frame 108 is provided in housing 110 and comprises gearstick hinge 112 (FIGS. 3A-B, 4A-C). Further, there is provides movable frame part 114 and hinge or shaft 112, 126 for the integrated gearstick 104 and tilting element 124.

Figures 3A, 3B:
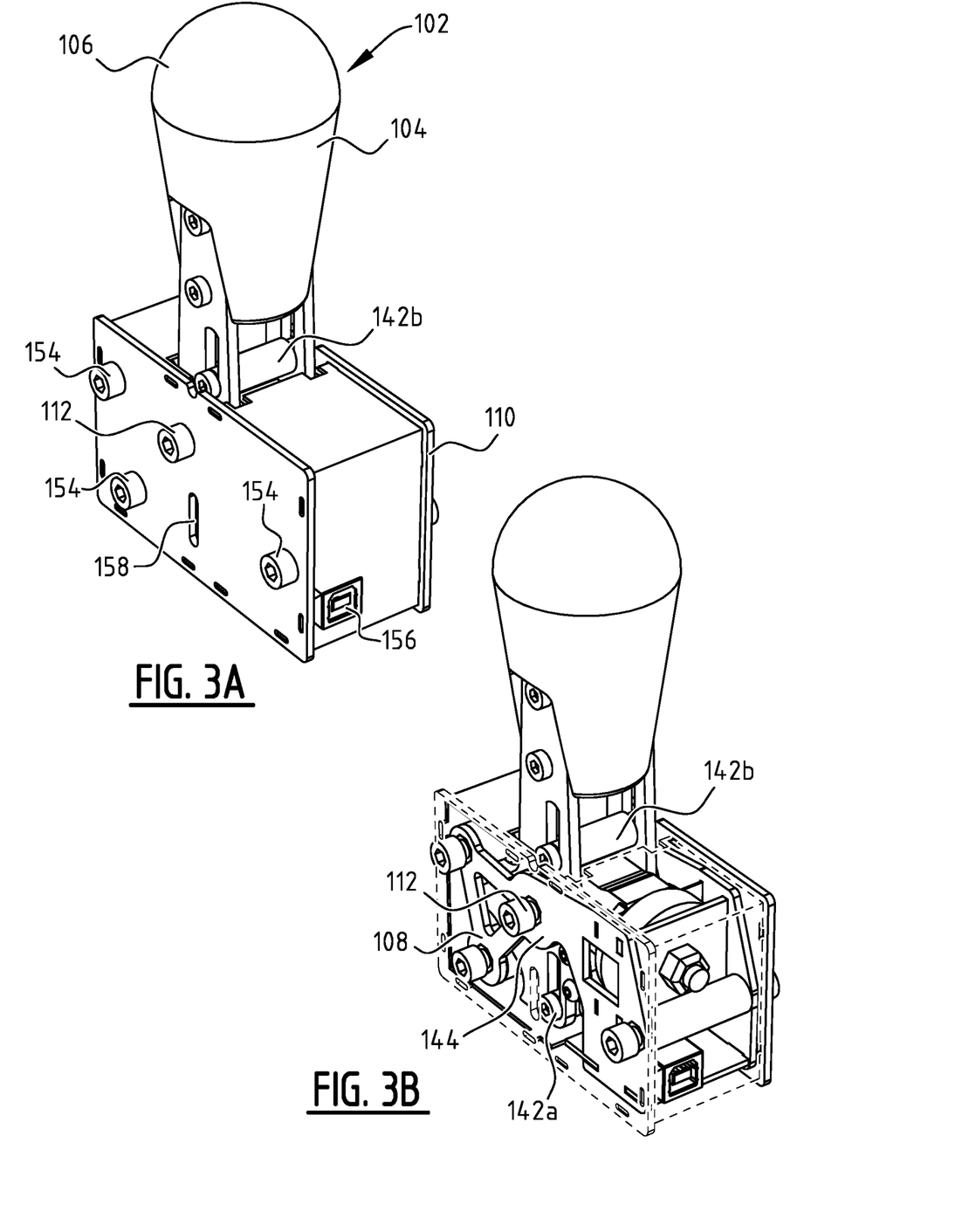
FIG. 3A-B show an alternative embodiment of a shifter simulator system of the present invention.
Figure 4A:
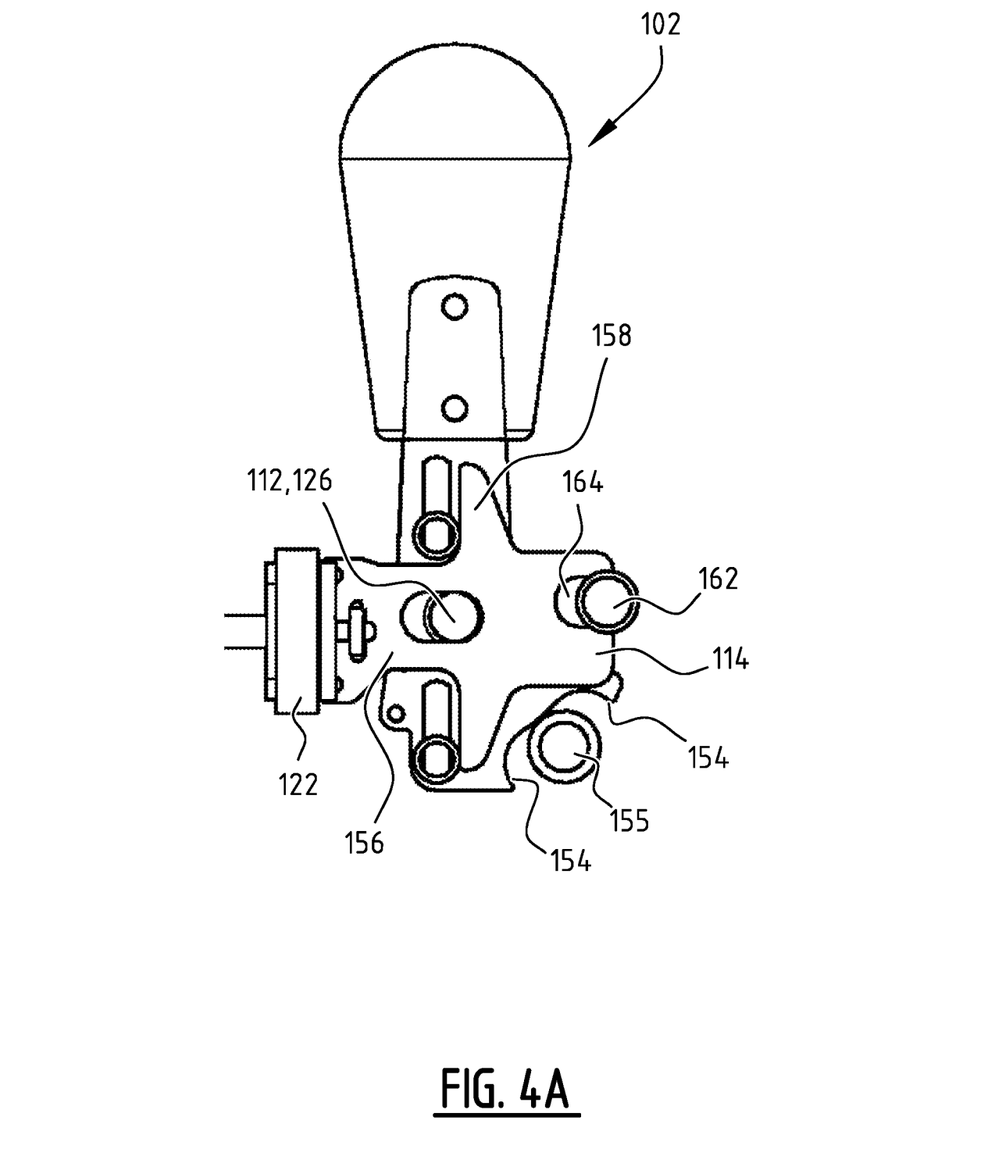
FIG. 4A-C show the operation of the shifter simulator system of FIG. 3.
Figure 4B:
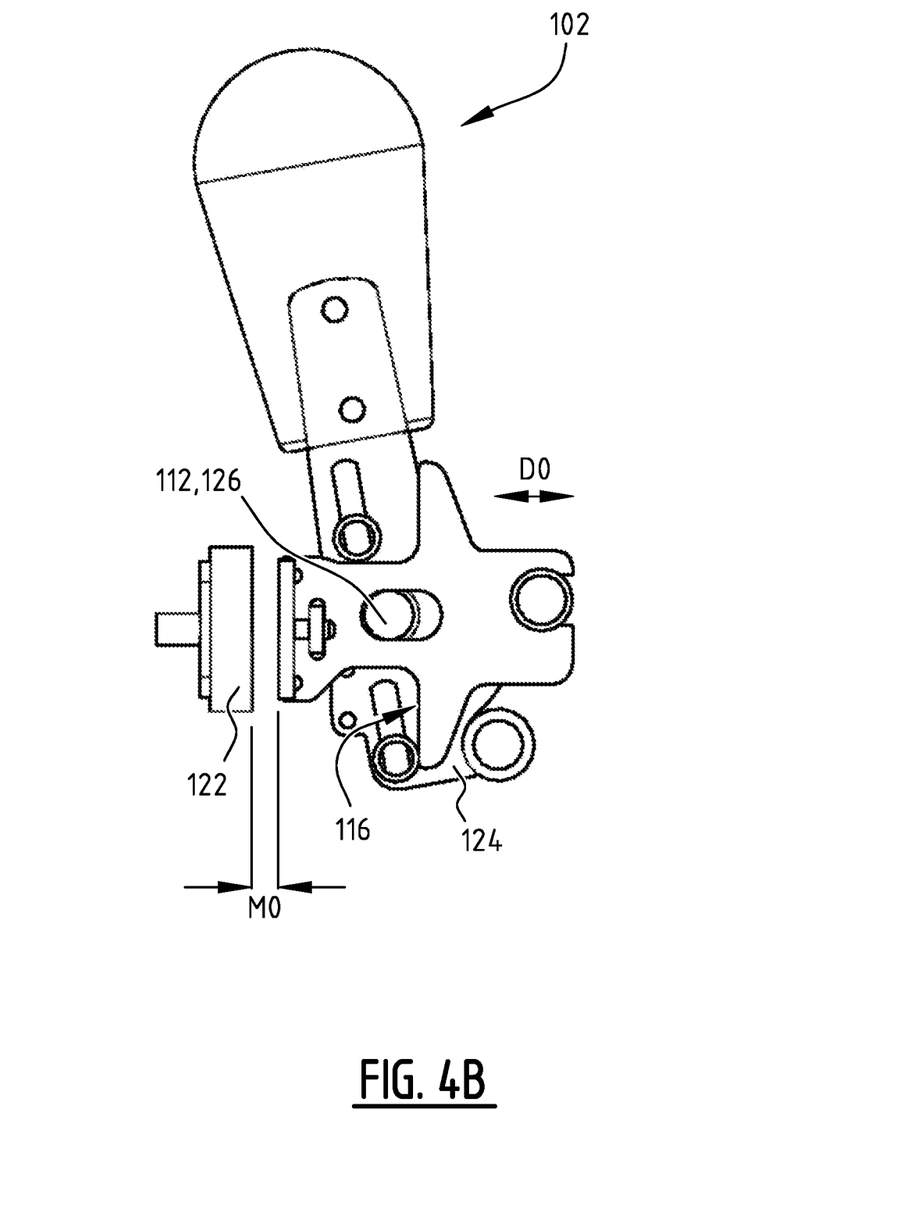
Figure 4C:
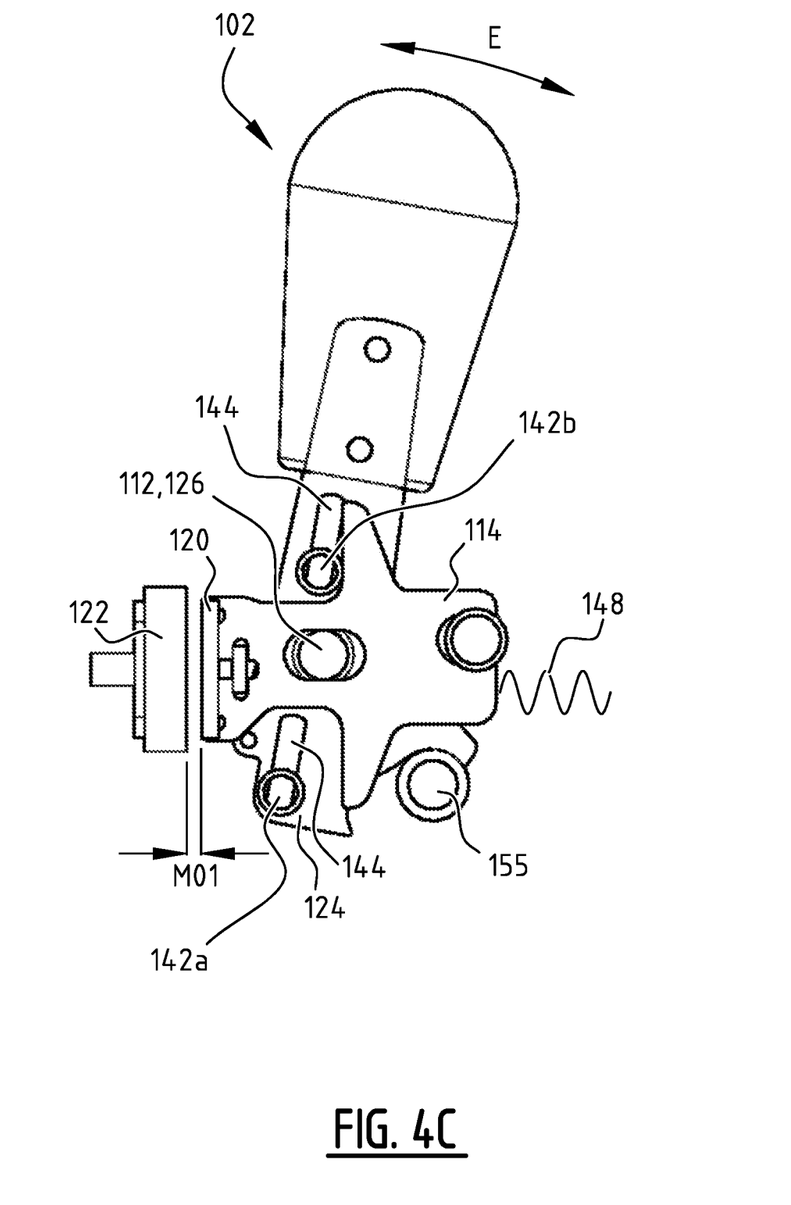

The integrated gearstick 104 and tilting element 124 comprises first and second contact elements 142 a-b that are provided in their respective grooves 144 and are configured for engaging respective contact surfaces 116 of movable frame part 114. Optionally, additional spring element 148 is provided that forces movable frame part 114 with plate element 120 into contact with permanent magnet 122 together defining magnetic contact 118. Contact elements 142 a-b can be repositioned along grooves 144 to adjust the second lever 158, while in the illustrated embodiment first lever 156 remains constant.

In the illustrated embodiment shifter simulator system 102 is provided with stop 155. Stops 154 (FIG. 4A) engage stop 155 to limit movement of gearstick 104. Optionally, movable frame part 114 is guided with the use of pen or pawl 162 and groove or groove-like element 164.

When moving gearstick 104 in direction E (FIG. 4C) first or second contact element 142 a-b engages the respective contact surface 116, thereby moving the movable frame part 114, optionally against the spring force of spring 148. Movement of movable frame part of 114 leads to a disengagement of contact 118 by removing plate 120 from permanent magnet 122.

In the illustrated embodiment second lever 158 can be adjusted by repositioning contact elements 142 a-b in groove-like element 144 over a distance of about 8 mm. Depending on the actual position in the illustrated embodiment the maximum contact distance of plate 20 with permanent magnet 122 is in the range of 3.3 to 5.5 mm. Depending on the dimensions and further settings it will be understood that these distances can be amended.

Figure 5:
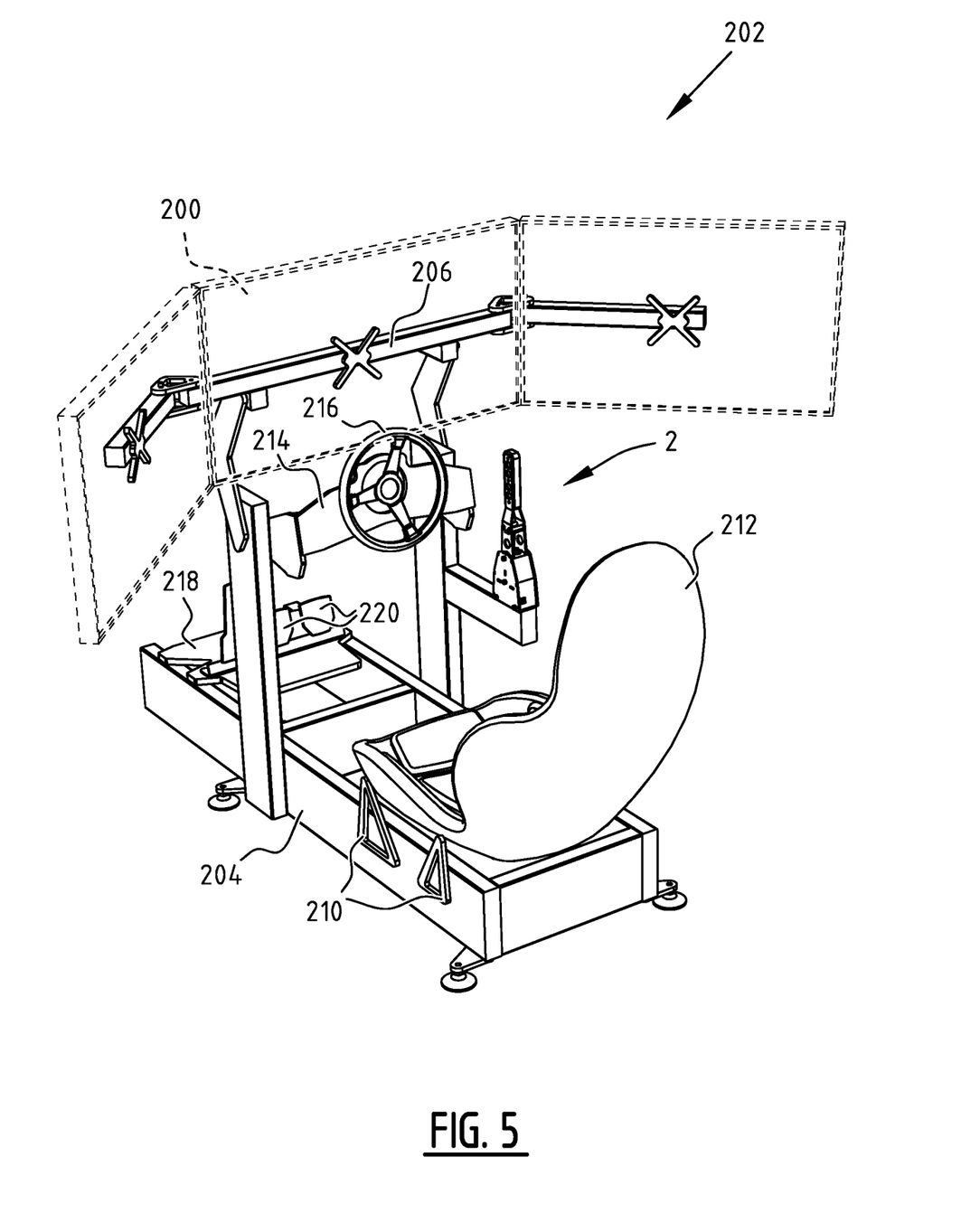
FIG. 5 shows a simulator comprising an embodiment of the shifter simulator system according to the present invention.

Simulator 202 (FIG. 5) comprises frame 204 with monitor frame 206 to which a number of monitors 208 can be attached. Simulator 202 further comprises chair frame 210 to which chair 212 can be attached. Furthermore, there is provided steer frame 214 to which steer 216 can be provided. Also, there is provided a pedals frame 218 to which a number of pedals 220 can be attached. In the illustrated embodiment a shifter simulator system 2 is provided and connected to the frame of simulator 202.

Figure 6:
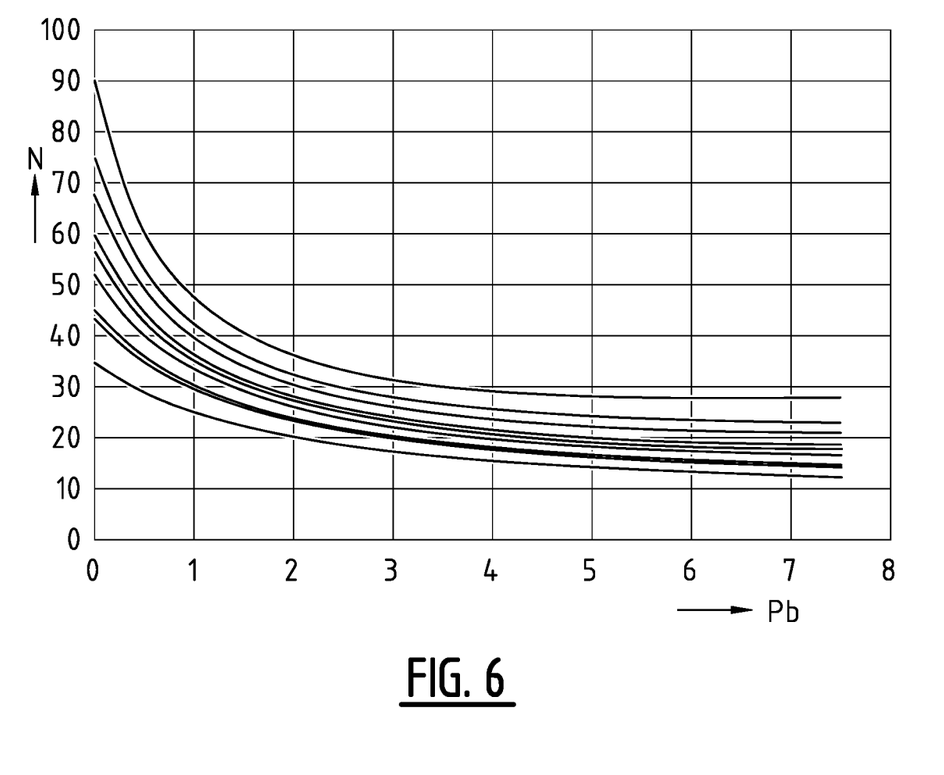
FIG. 6 shows some results of the required shifter force relative to the gearstick angle for different settings of the shifter simulator system in an embodiment of the present invention.

A number of tests have been performed with shifter simulator systems 2, 102 that comprises a double lever system 56, 58, 156, 158. A continuous adjustable lever provides numerous tuning possibilities for a user to bring the behavior of the shifter simulator system 2, 102 into accordance with his own preferences and/or with the settings of simulator 202 and/or the settings in the simulator game such as a vehicle type. FIG. 6 shows the shifter force (Newton) versus the gearstick angle for different combinations of setting of system 2, 102. This shows the flexible character of the shifter simulator system 2, 102 according to the present invention.

The present invention is by no means limited to the above-described preferred embodiments thereof. The rights sought are defined by the following claims, within the scope of which many modifications can be envisaged.

The invention claimed is:

1. A Shifter simulator system for a simulator environment, the system comprising:
   a frame with a gear stick hinge;
   a gear stick that is hingedly connected to the frame via the gear stick hinge;
   a moveable frame part configured for moving relative to the frame and provided with a first contact surface and a second contact surface;
   a magnetic contact; and
   a tilting element configured for tilting around a tilting axis via a tilting connection in response to a movement of the gear stick and providing a first lever, and wherein the tilting element is provided with a first contact element and a second contact element configured for engaging the respective first and second contact surfaces of the moveable frame part providing a second lever, and by moving the moveable frame part defining a shifter movement with the magnetic contact.

2. The shifter simulator system according to claim 1, further comprising a spring element configured for providing a counter force.

3. The shifter simulator system according to claim 1, wherein the tilting connection is an adjustable connection.

4. The shifter simulator system according to claim 2, wherein the tilting connection is an adjustable connection.

5. The shifter simulator system according to claim 3, wherein the adjustable connection is continuously adjustable in a first adjustment range.

6. The shifter simulator system according to claim 5, wherein the first and/or second contact elements are adjustable.

7. The shifter simulator system according to claim 6, wherein the adjustable first and/or second contact elements are positionable on the tilting element, wherein the first and second contact elements are separately positionable.

8. The shifter simulator system according to claim 7, wherein the adjustable first and/or second contact elements are continuously adjustable in a second adjustment range.

9. The shifter simulator system according to claim 8, wherein the magnetic contact comprises a permanent magnet.

10. The shifter simulator system according to claim 9, wherein the permanent magnet is stationary fixated in the frame.

11. The shifter simulator system according to claim 1, wherein the first and/or second contact elements are adjustable.

12. The shifter simulator system according to claim 11, wherein the adjustable first and/or second contact elements are positionable on the tilting element.

13. The shifter simulator system according to claim 12, wherein the first and second contact elements are separately positionable.

14. The shifter simulator system according to claim 11, wherein the adjustable first and/or second contact elements are continuously adjustable in a second adjustment range.

15. The shifter simulator system according to claim 1, wherein the magnetic contact comprises a permanent magnet.

16. The shifter simulator system according to claim 15, wherein the permanent magnet is stationary fixated in the frame.

17. The shifter simulator system according to claim 1, further comprising a stop.

18. The shifter simulator system according to claim 1, further comprising an optical sensor for detecting a shifter position and/or a shifter movement.

19. A simulator comprising a shifter simulator system for a simulator environment, the system comprising:
    a frame with a gear stick hinge;
    a gear stick that is hingedly connected to the frame via the gear stick hinge;
    a moveable frame part configured for moving relative to the frame and provided with a first contact surface and a second contact surface;
    a magnetic contact; and
    a tilting element configured for tilting around a tilting axis via a tilting connection in response to a movement of the gear stick and providing a first lever, and wherein the tilting element is provided with a first contact element and a second contact element configured for engaging the respective first and second contact surfaces of the moveable frame part providing a second lever, and by moving the moveable frame part defining a shifter movement with the magnetic contact.

20. A method for operating a shifter simulator system for a simulator environment, comprising the steps of:
    providing a shifter simulator system for a simulator environment, the system comprising:
        a frame with a gear stick hinge;
        a gear stick that is hingedly connected to the frame via the gear stick hinge;
        a moveable frame part configured for moving relative to the frame and provided with a first contact surface and a second contact surface;
        a magnetic contact; and
        a tilting element configured for tilting around a tilting axis via a tilting connection in response to a movement of the gear stick and providing a first lever, and wherein the tilting element is provided with a first contact element and a second contact element configured for engaging the respective first and second contact surfaces of the moveable frame part providing a second lever, and by moving the moveable frame part defining a shifter movement with the magnetic contact; and
    moving the gear stick such that the magnetic contact is influenced.

* * * * *